United States Patent [19]

Evans et al.

[11] Patent Number: 5,138,755

[45] Date of Patent: Aug. 18, 1992

[54] VESSEL AND PIPELINE INSERTION TOOL

[76] Inventors: Willie V. Evans; Gary K. Evans, both of 104 W. Lantrip, Kilgore, Tex. 75662

[21] Appl. No.: 467,793

[22] Filed: Jan. 19, 1990

[51] Int. Cl.⁵ .............................................. B23P 19/04
[52] U.S. Cl. ....................................... 29/263; 29/256; 73/866.5
[58] Field of Search ................. 29/256, 263, 705, 720; 254/29 R, 30, 31; 248/413; 403/362, 373; 73/86, 866.5; 279/41

[56] References Cited

U.S. PATENT DOCUMENTS

| | | | |
|---|---|---|---|
| 724,475 | 4/1903 | Hilmo | 279/41 X |
| 1,498,062 | 6/1924 | Albaugh | 254/29 R |
| 1,898,264 | 12/1930 | Proefke | 403/362 X |
| 2,485,022 | 10/1949 | Taylor | 29/256 X |
| 3,007,340 | 9/1958 | Kraftson | 73/866.5 |
| 3,025,464 | 3/1962 | Bond | 73/866.5 X |
| 4,631,967 | 12/1986 | Welker | 73/866.5 X |
| 4,633,713 | 1/1987 | Mesnard et al. | 73/866.5 |
| 4,697,465 | 10/1987 | Evans et al. | 73/86 X |
| 4,926,704 | 5/1990 | Survil et al. | 73/866.5 |

Primary Examiner—Timothy V. Eley
Assistant Examiner—C. Richard Martin
Attorney, Agent, or Firm—Matthews and Assoc.

[57] ABSTRACT

A packer joint is provided for mounting on a vessel or pipeline entry valve which includes a stinger guide and an adjustable packer seal. A driving mechanism is mounted on the packer joint to which the stinger is connected for insertion through the packer joint into the vessel or pipe line. Improved clamping collets are mounted within the packer joint to retain the stinger in the desired position after insertion. A safety cap is provided for mounting on or around the packer joint and exposed end of the stinger after the stinger is inserted and the driving mechanism removed.

18 Claims, 11 Drawing Sheets

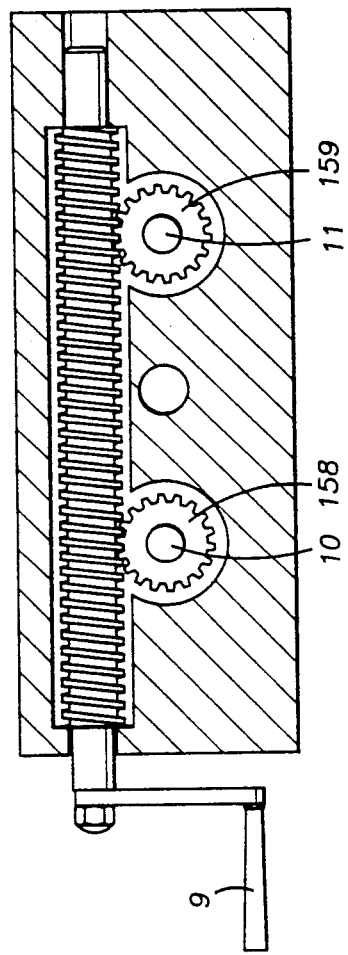
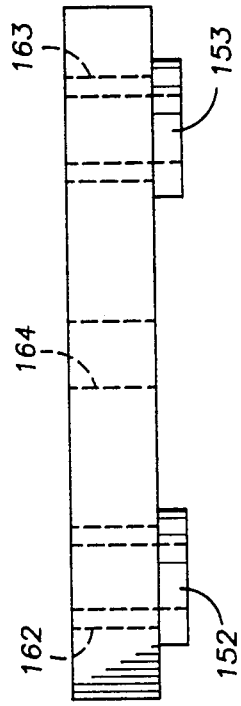
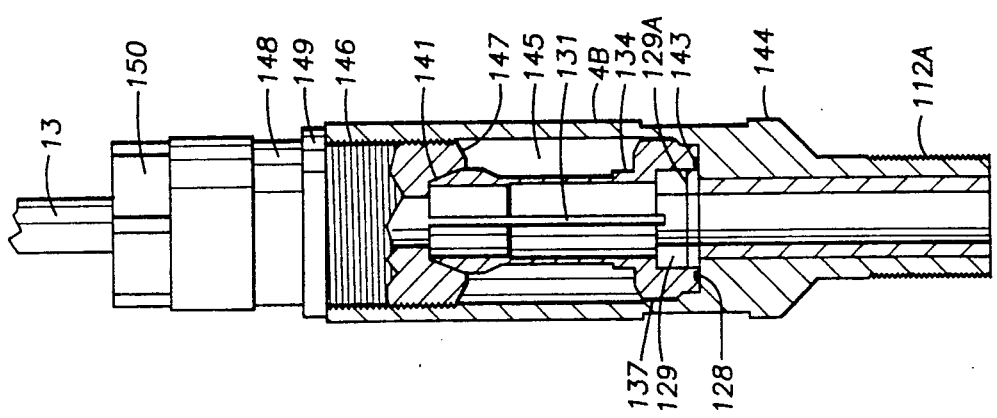
FIG. 10
FIG. 11
FIG. 8

VESSEL AND PIPELINE INSERTION TOOL

BACKGROUND OF THE INVENTION

Tools and other special devices are often required to be inserted into pressurized vessels and pipelines. Such devices include corrosion coupon holders as disclosed in my earlier U.S. Pat. No. 4,697,465, sample probes and fluid injection devices. Some of the devices come with self contained valves and packers to allow the device, sometimes called a stinger, to be inserted into the vessel or pipeline while sealing against the pressure contained therein. If the pressure is significant, such as several hundred to several thousand pounds per square inch, it is often difficult to force the stinger into the vessel or pipeline against the pressure. Additionally, the packing seal may have to be so tight that the stinger may not be forced inward by hand.

A need was thus seen for a universal insertion tool which could accommodate most devices which are inserted into pressurized vessels or pipelines. A reliable clamping mechanism was needed to assure that the stinger remained in place after the device was inserted. A driving mechanism mountable with the insertion tool would greatly facilitate insertion of the various devices.

SUMMARY OF THE INVENTION

A new and improved vessel and pipeline insertion tool includes a packer joint mountable on a vessel or pipeline entry valve which includes a stinger guide and an adjustable packer seal. A driving mechanism is mounted on the packer joint to which the stinger is connected for insertion through the packer joint into the vessel or pipe line. Improved clamping collets are mounted within the packer joint to retain the stinger in the desired position after insertion. A safety cap is provided for mounting on or around the packer joint and exposed end of the stinger after the stinger is inserted and the driving mechanism removed.

BRIEF DESCRIPTION OF THE DRAWING

FIG. 8 is a side elevational view in cross section of a packer joint utilizing the collet clamp of FIG. 6.

FIG. 10 is a detailed view of the power transmission assembly of the driving mechanism shown in FIG. 9.

FIG. 11 is a detail of the cross bar on the driving mechanism shown in FIG. 9.

DETAILED DESCRIPTION OF THE PREFERRED EMBODIMENTS

For a detailed description of the preferred embodiments of the present invention the reader is directed to the accompanying figures in which like components are given like numerals for ease of reference.

Figure 1:
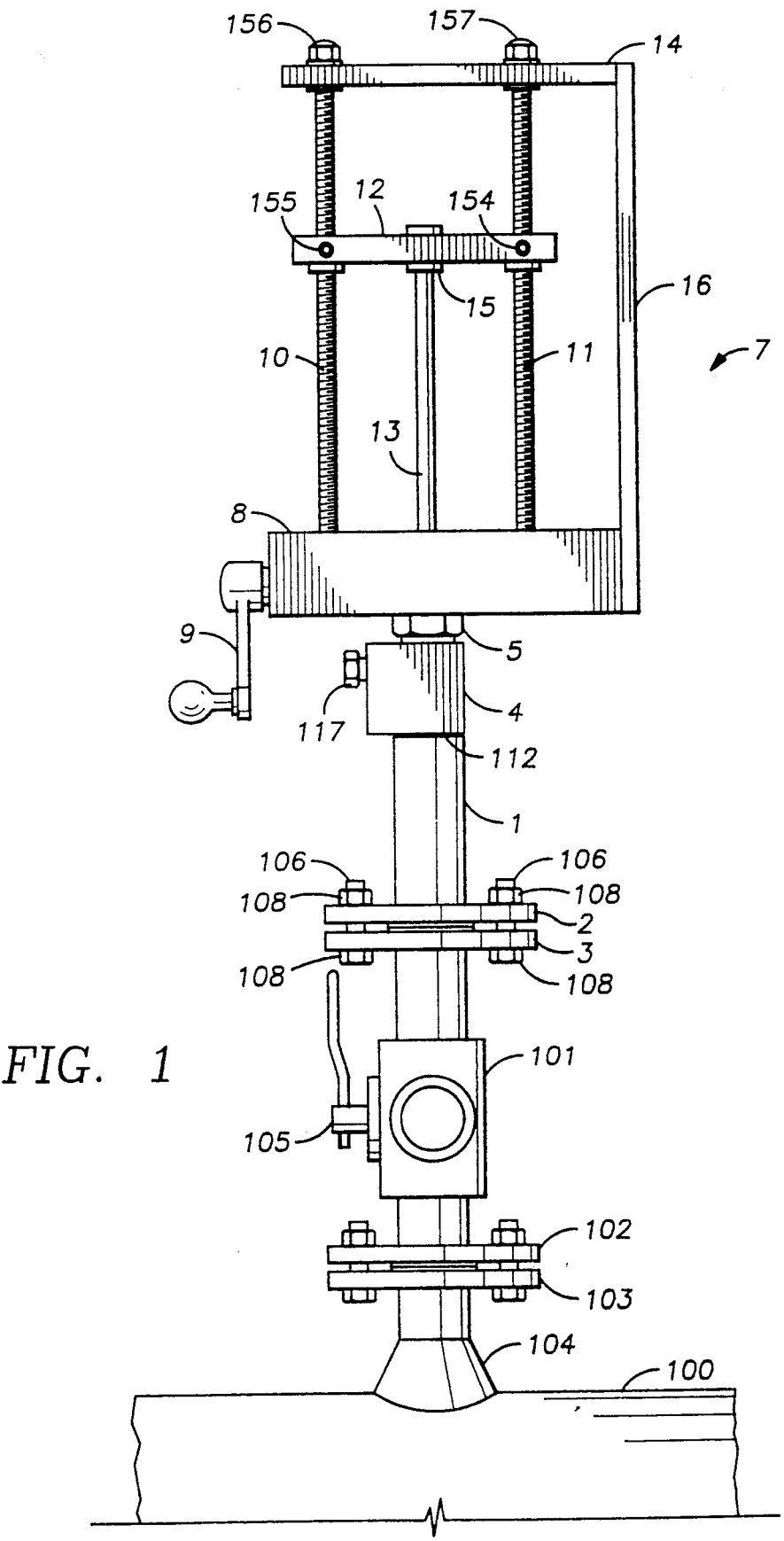
FIG. 1 is a side elevational view of one embodiment of the present invention mounted on a pipeline valve.

FIG. 1 depicts an overall elevational view of one embodiment of the present invention as mounted on the pipe line 100. As shown, the pipeline 100 includes a saddle 104 welded in place which includes flange member 103. A full port valve 101, such as a ball valve, is mounted by flange member 102 to pipeline flange 103. A guide body 1 for stinger 13 is likewise mounted by a flange 2 to outer valve flange 3. A packer joint 4 is threadedly secured to guide body 1.

Stinger driving mechanism, generally indicated at 7, is threadedly mounted to packer joint 4 by connection 5 on base 8. Driving mechanism 7 is shown to comprise base 8 and a frame having side member 16 and top member 14. All thread rods 10 and 11 are rotatably mounted between top frame member 14 and base 8. Cross bar 12 is in threaded engagement with each of the thread rods 10 and 11. In the base 8 there is a power transmission assembly which rotates all thread rod 10 and 11 in response to rotation of crank 9. The stinger 13 is threadedly engaged to cross bar 12 by connection 15 such that when the crank 9 is rotated, stinger 13 is made to move in or out through packer joint 4, guide body 1 and valve 101 into pipeline 100.

The stinger 13 may be any variety of instrument or tool that requires insertion into a pipeline or vessel such as a corrosion coupon holder, sampling tube or injection device. The flanged connections shown may be easily replaced by standard threaded connections or vice versa.

Figure 2:
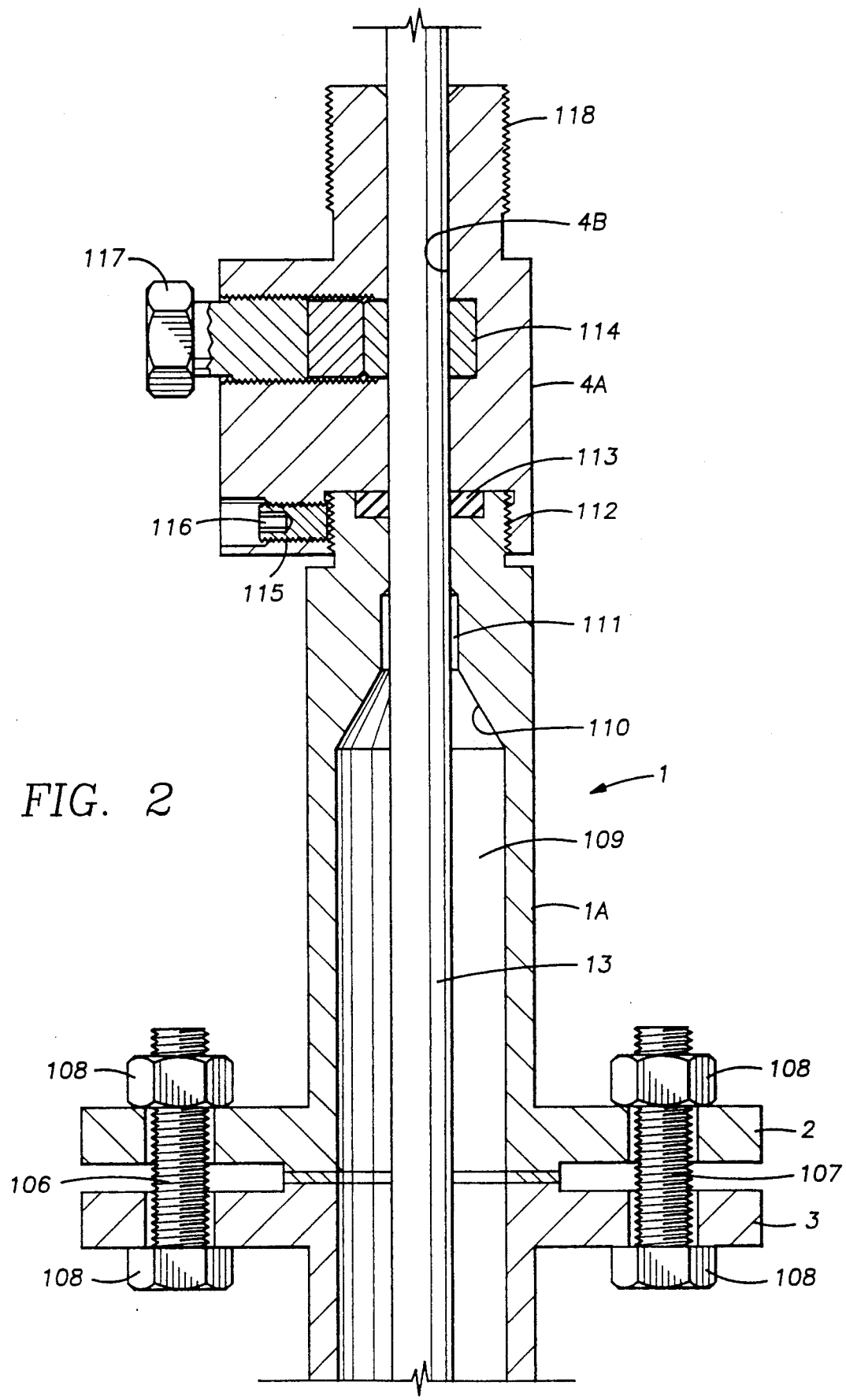
FIG. 2 is a side elevational view in cross section of one embodiment of the packer joint and mounting base.

Referring now to FIG. 2 a detailed view of one embodiment of the packer joint 4 is shown mounted by internal threads 112 onto guide body 1. As noted in FIG. 1 guide body 1 is mounted by flange member 2 to outer valve flange member 3. The guide body 1 includes an elongated housing 1A which provides an internal elongated chamber 109 which is in alignment with the passage through valve 101. The upper end of housing chamber 109 ends in a conical dome 110 which leads to central aperture 111 which snugly receives stinger 13. The domed shape of the upper end of chamber 109 is designed as a safety stop as described in my earlier U.S. Pat. No. 4,697,465 which is herein incorporated by reference. At the top of the guide body 1 is a packing seal 113 which fits about stinger 13 and is forced into tight sealing engagement therewith when packer joint 4 is threaded onto body threads 112.

Packer joint 4 is shown to comprise body 4A with an internal bore 4B therethrough which is in axial alignment with aperture 111 and housing chamber 109. A locking screw in the form of allen bolt 115 is provided to securely lock the packer joint 4 to guide body 1 and secure the seal 113 against stinger 13. A collet clamp 114 is provided to lock the stinger 13 at the desired position when collet bolt 117 engaged against collet 114.

Figure 3A:
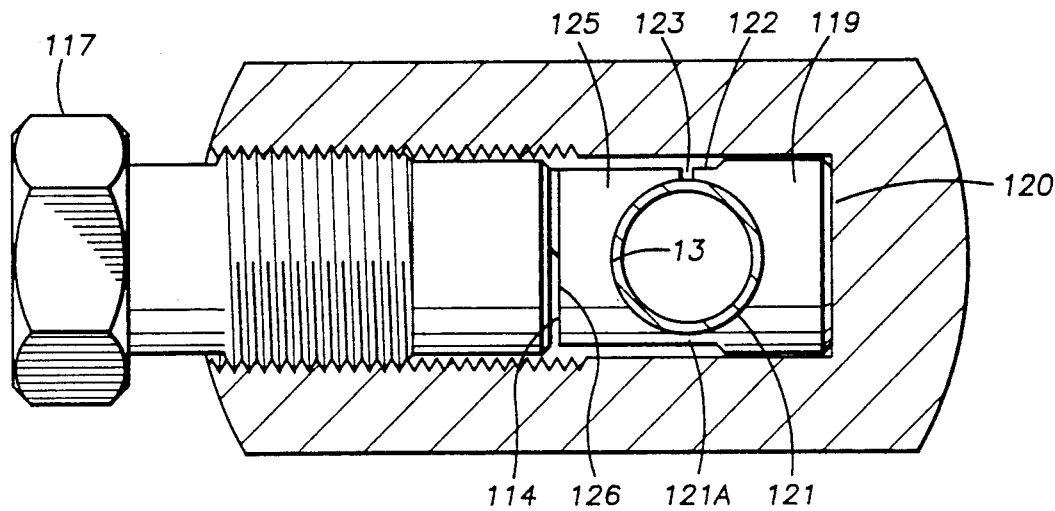
FIG. 3A is a top view of one embodiment of the collet clamp as used in the packer joint of FIG. 2.
Figure 3B:
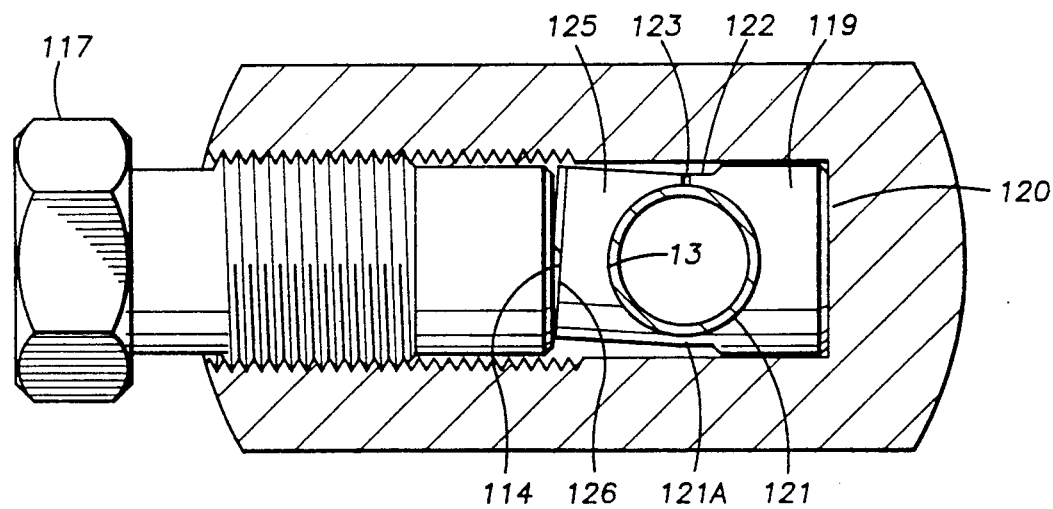
FIG. 3B is a top view of the collet of FIG. 3A clamped about a tubing stinger.
Figure 4:
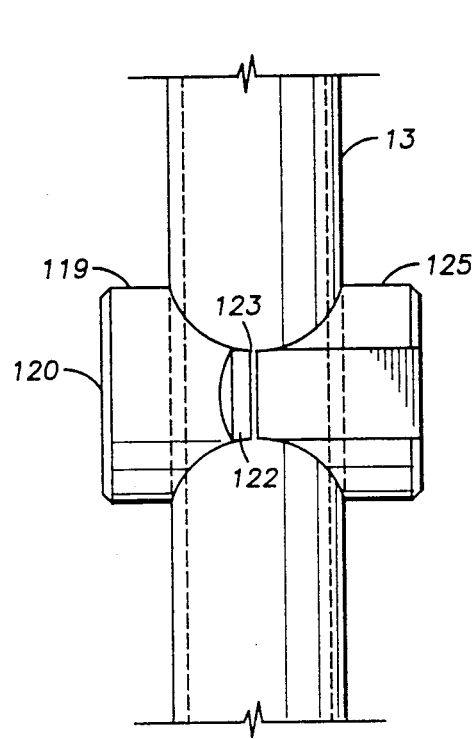
FIG. 4 is a side view of the collet clamp of FIG. 3.
Figure 5:
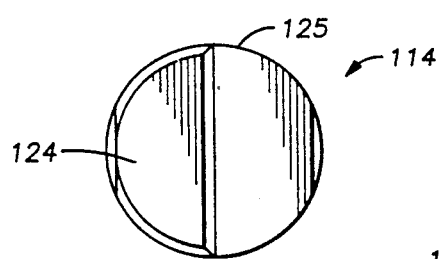
FIG. 5 is an end view of the collet clamp of FIG. 3.

Referring now to FIGS. 3A-5, one embodiment of the collet clamp 114 is shown in detail. The collet clamp depicted therein is particularly useful for clamping tubing might comprise the stinger herein because it will securely grip the tubing without collapsing the tubing. FIG. 3A shows the collet 114 as viewed from the top. The collet clamp 114 includes two top surfaces 119 and 125 connected by saddle shaped section 121A. Aperture 121 is adapted to fit closely around the desired stinger 13. On one side of the saddle, a split 123 is provided for resiliency. Surface 124 provides a drive area adjacent the split 123. The collet clamp 114 is mounted within packer joint 4 such that drive area 124 is facing the collet bolt 117. When the bolt 117 engages the surface 124, reduced shoulder 122 collapses about the stinger as shown in FIG. 3B to secure the stinger in position. The gripping force is thus distributed 180° about the tubing preventing deformation which could cause leakage through the packing gland.

Figure 6:
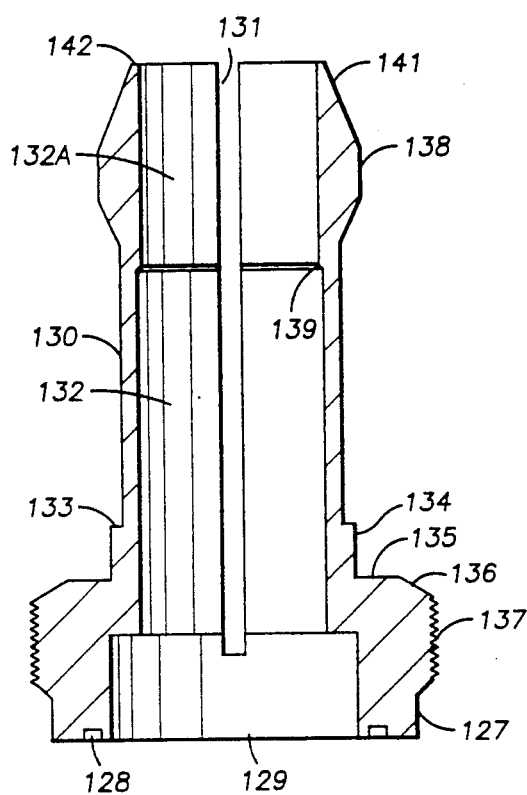
FIG. 6 is a side elevational view in cross section of another collet clamp which may be used in the packer joint.
Figure 7:
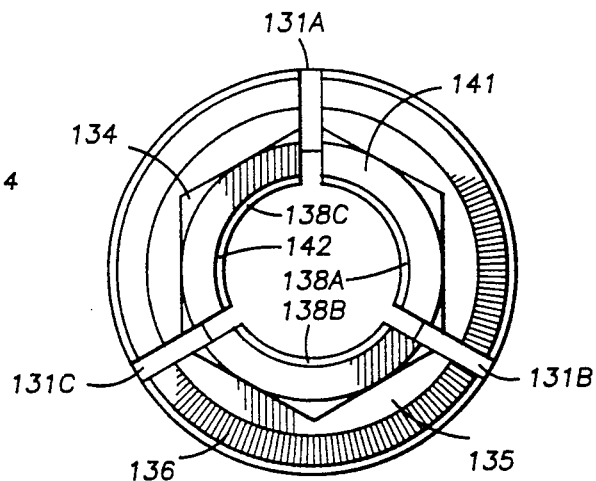
FIG. 7 is a top view of the collet clamp of FIG. 6.

Referring now to FIGS. 6-8 an alternative collet clamp 114A is detailed along with an alternative packer joint 4B adapted to receive alternative collet clamp 114A. The alternative collet clamp 114A is seen to comprise a lower base section 127 which includes seal grove 128. Integral with lower base 127 are external threads 137 adapted to fit into internal threads within alternative packer joint 4B. Large bore 129 in base 127 is adapted to receive a packing seal 129A which is forced tightly about stinger 13 in the lower end of packer joint 4B. A hex nut surface 134 is provided to receive a deep socket wrench to thread collet clamp 114A into packer joint 4B.

Through collet clamp 114A is an elongated bore having two diameters 132 and 132A. Bore 132 fits loosely about stinger 13 while bore 132A fits snugly about stinger 13. Three longitudinal slits 131a-c are provided in the wall of collet clamp 114A to provide a small degree of flexibility. Gripping jaws 138a-c are provided around the upper end of collet clamp 114A. The upper surface 141 of gripping jaws 138a-c is sloped outward to receive lower end of collet clamp nut 148. Clamp nut 148 is threaded into the upper end of packer joint 4B and when clamp nut 148 is screwed inward it engages surfaces 141 forcing gripping jaws 138a-c into tight engagement with stinger 13. Locking nut 149 is provided to secure clamp nut 148 from further rotation. While there are the preferred embodiments of the collet clamp as discussed herein, many other embodiments are possible including a simple bolt or screw which would pinch and/or hold the stinger or place by abutment therewith.

Figure 9:
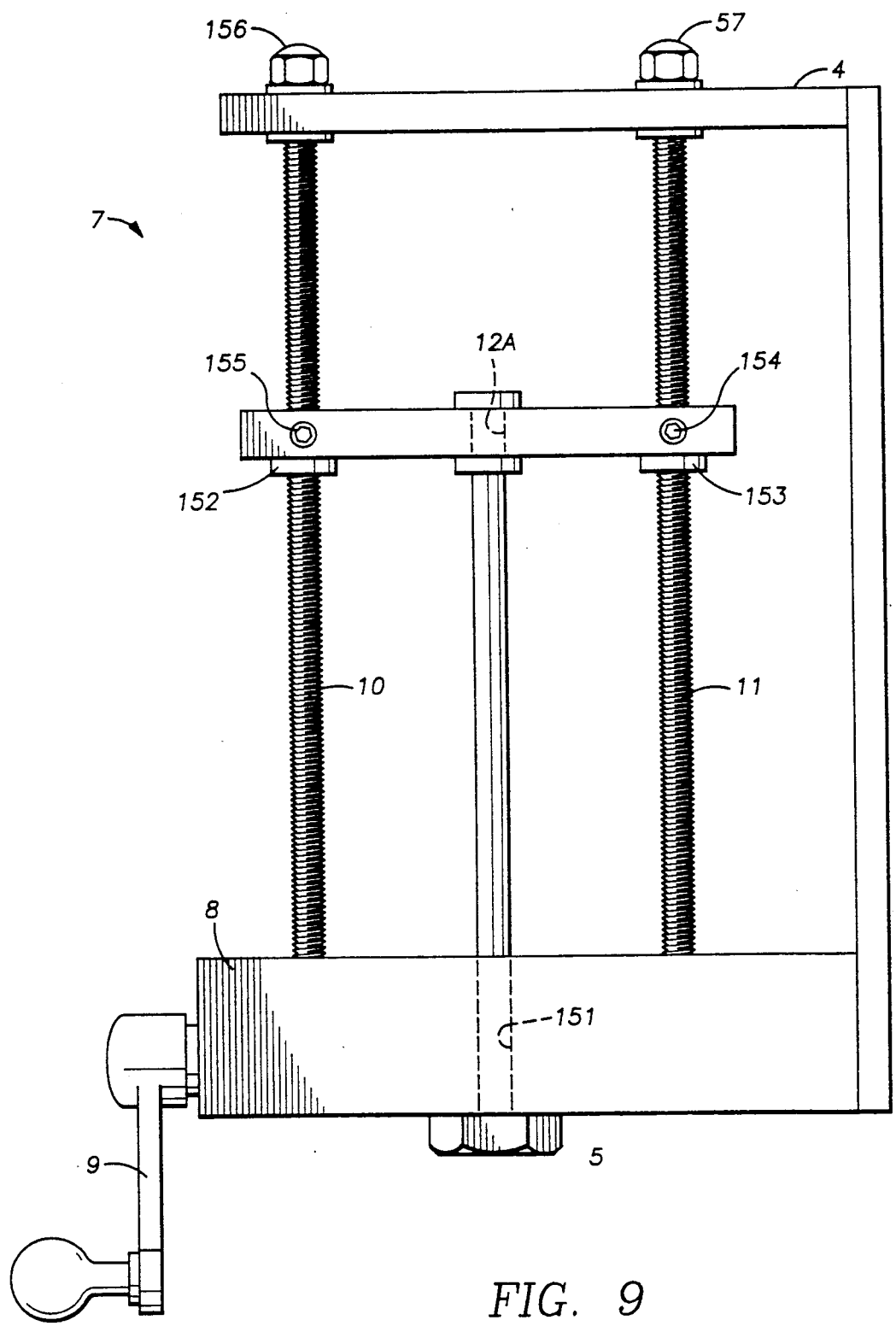
FIG. 9 is a side elevational view of one embodiment of the driving mechanism of the present invention.

Referring now to FIG. 9, one embodiment of the stinger driving mechanism 7 is shown in a side elevational view. Stinger driving mechanism is seen to comprise a base 8 and frame having side member 16 and top member 14. Base 8 includes a bore 151 to allow passage of the stinger 13 therethrough with a hex nut connector 5 provided directly below bore 151. Hex nut 5 is adapted to fit on external threads of packer joint as seen in FIG. 1. Two all thread rods 10 and 11 are rotatably mounted between base 8 and top frame member 14. The all thread rods 10 and 11 are supported within base 8 by a pair of thrust bearings (not shown) and held in place through frame member 14 by retaining nuts 156 and 157. Cross bar 12 is threadedly engaged to each of all thread rods 10 and 11. In the embodiment shown the internal threads of cross bar are provided as brass sleeves 152 and 153 secured within bores in cross bar 12 by Allen bolts 154 and 155. Cross bar 12 also includes through bore 12A to receive the upper end of stinger 13 (not shown) where the stinger may be threadedly engaged with cross bar 12 or held in place by nuts on stinger.

Referring now to FIG. 10, a specific power transmission assembly is illustrated. Gear wheels 158 and 159 are secured about each of all threads 10 and 11 respectfully within base 8. Driving shaft 160 including worm gear 161 is mounted within base 8 adjacent to gear wheels 158 and 159 with worm gear in engagement with gear wheels 158 and 159. A crank handle 9 is provided to rotate driving shaft 160 with worm gear 161. When the crank 9 is rotated the worm gear 161 drives gear wheels 158 and 159 causing the all thread rods 10 and 11 to rotate. The cross bar 12, being in threaded engagement with all thread rods 10 and 11, is thus forced upward or downward depending upon the direction of rotation of crank 9. A stinger which would be attached to cross bar 12 would thus be driven inwardly or outwardly. The worm gear provides a very "low" gear ratio to allow ease of insertion of the stinger against very high pressures (up to 15,000 psig) and tight packing.

Figure 15:
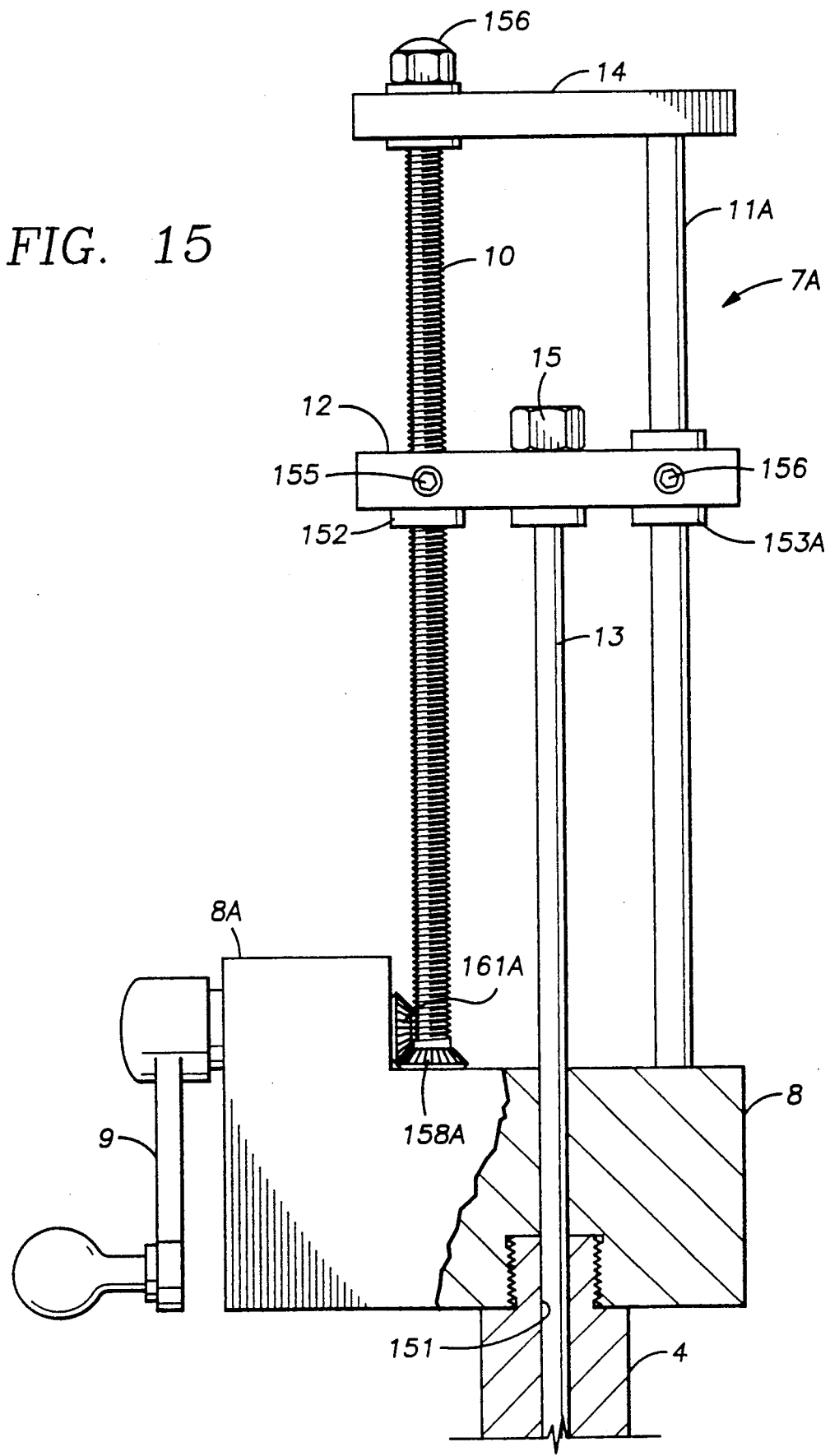
FIG. 15 is a side elevational view of an alternative driving mechanism of the present invention.

Referring now to FIG. 15, an alternate driving mechanism 7A is shown which is useful for lower pressures. The alternative driving mechanism comprises a base 8 threadedly connected to packer joint 4. Because the alternative driving mechanism 7A is used in lower pressure applications, there is less force applied outward and thus the torsional forces about stinger 13 are less. Thus, only one all thread rod 10 is mounted between base 8 and upper member 14. A guide rod 11A is substituted for the second all thread rod 11 of FIG. 9, guide rod 11A also acting as side frame member 16.

The power transmission assembly of the alternative driving mechanism 7A comprises a pair of bevel gears 161A and 158A. First bevel gear 161A is supported in housing 8A and connected to crank handle 9 for rotation. Second bevel gear 158A is secured to all thread rod 10 and in engagement with first bevel gear 161A. Cross bar 12 is in threaded engagement with all thread rod 10 through internally threaded sleeve 152 which is held in place by Allen bolt 155. Another internal sleeve 153A about guide rod 11A in cross bar 12 acts as a smooth bearing surface between guide rod 11A and cross bar 12. Stinger 13 is secured to cross bar 12 such that when crank handle 9 is rotated, bevel gear 161A rotates bevel gear 158A which in turn rotates all thread rod 10 to move cross bar 12 carrying stinger 13 inwardly or outwardly.

Figure 16:
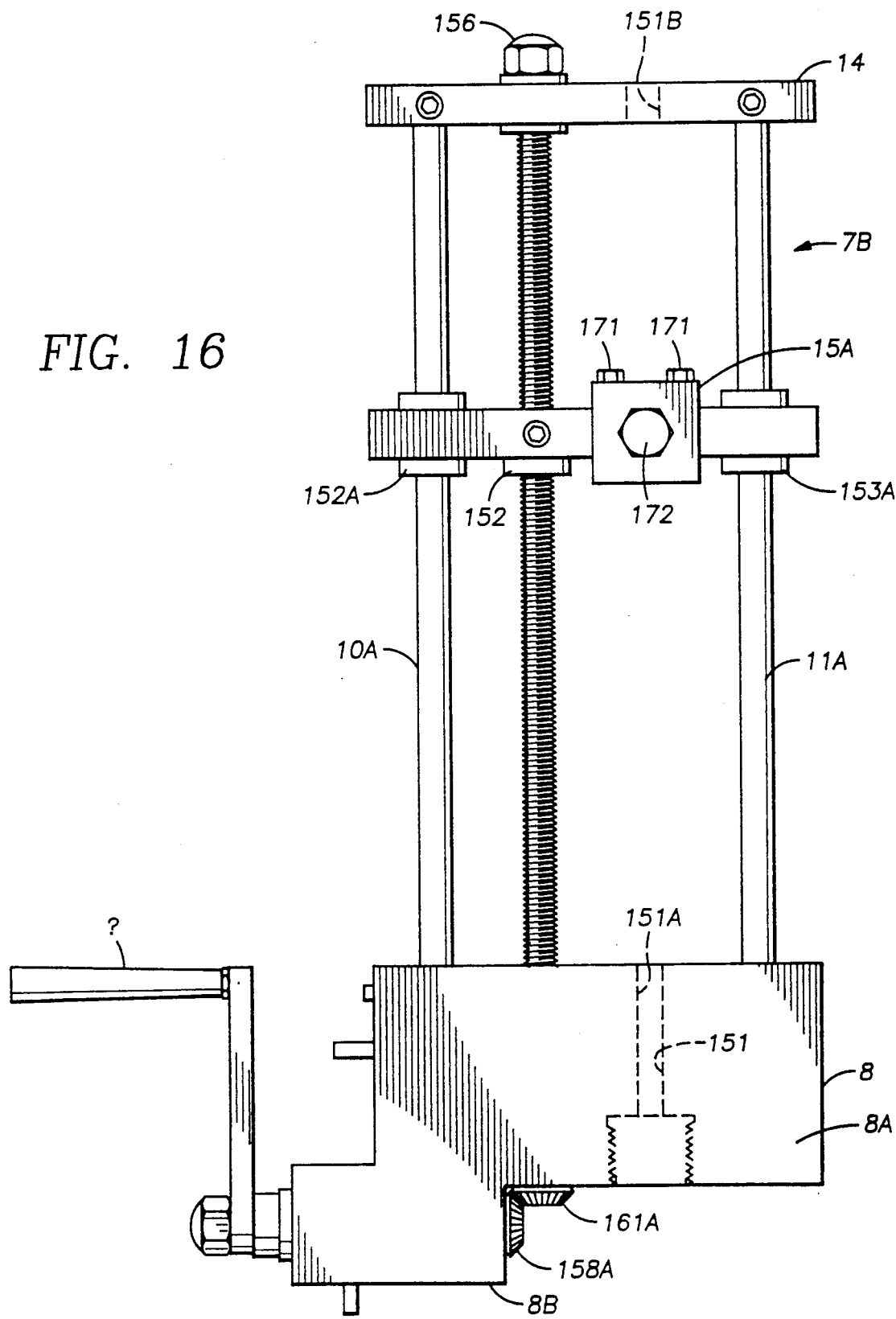
FIG. 16 is a side elevational view of another alternative driving mechanism for inserting long stingers.
Figure 17:
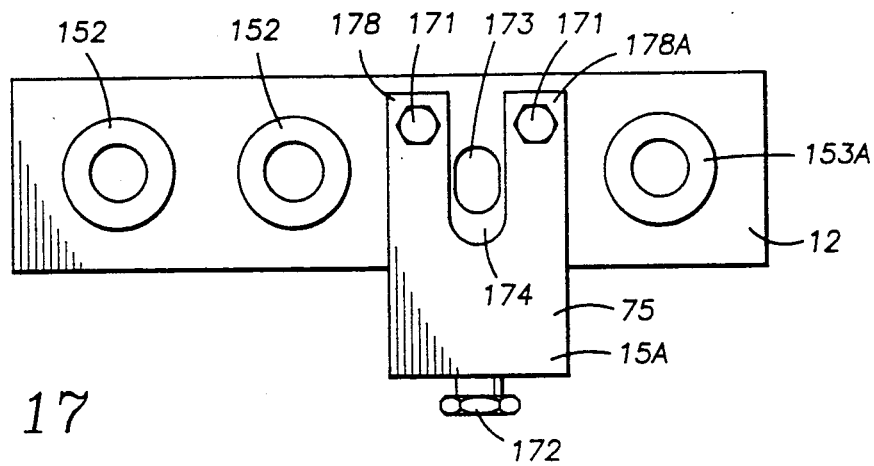
FIG. 17 is a top view of a stinger locking mechanism as mounted on the driving mechanism of FIG. 16.
Figure 18:
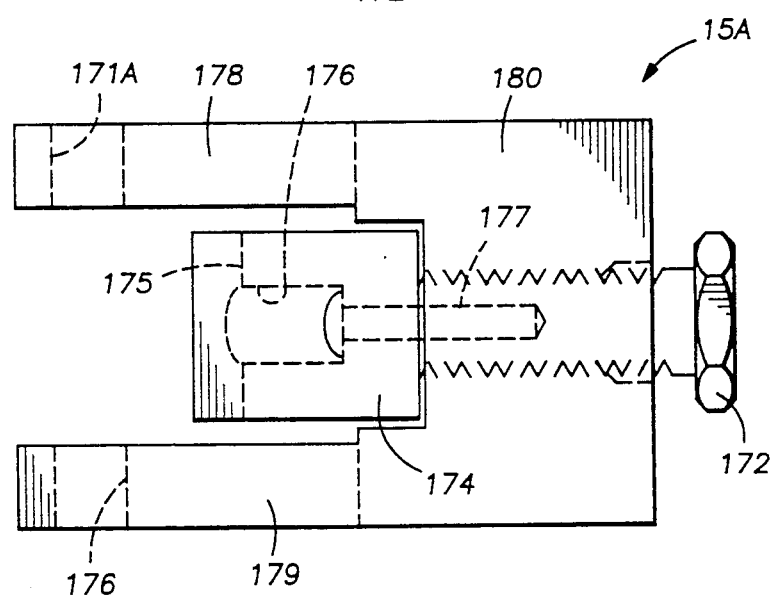
FIG. 18 is a side elevational view of the locking mechanism of FIG. 17.
Figure 19:
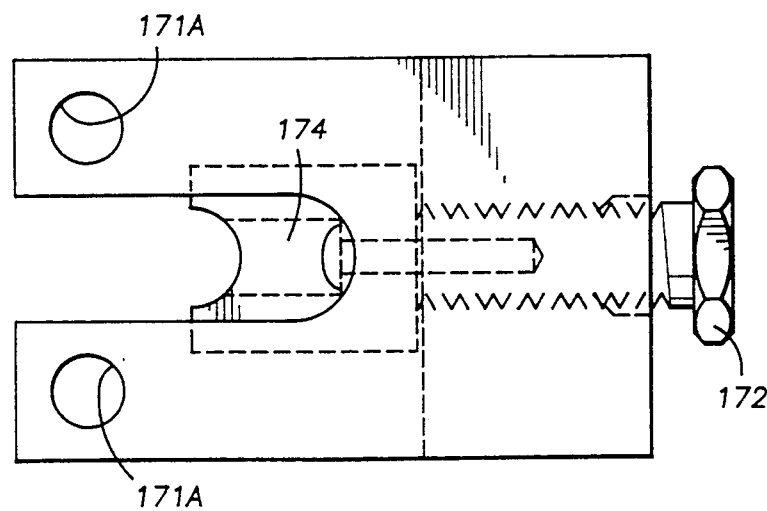
FIG. 19 is a top view of the locking mechanism of FIG. 17.

Another alternative driving mechanism 7B is depicted in FIG. 16-18. The driving mechanism 7B is useful for inserting stingers which are longer than the mechanism frame. The driving mechanism 7B is similar to 7A shown in FIG. 15 in that only one all thread rod 10 is used to drive cross bar 12. However, two guide rods 10A and 11A are used to connect housing 8 with top member 14, and the all thread rod 10 is adjacent the bore 151. Bevel gears 158A and 161A, while arranged slightly differently than in driving mechanism 7A, work in the same manner to rotate all thread rod 10 in response to rotation of crank handle 9.

Bore 151 is connected to surface 8a by longitudinal slot 151a. In addition to bore 151 in housing 8 there is also included a slot 151b in upper frame member 14 to allow passage of a stinger (not shown) therethrough. Clamping block 15A is provided on cross bar 12 to secure the stinger to the bar 12 for movement therewith.

FIGS. 17 and 18 show detail of the clamping block 15A and its mounting on cross bar 12. The clamping block 15A is seen to include a body 180 having upper and lower fingers 178, 178a, 179 and 179a extending outward therefrom. The fingers fit snugly about cross bar 12 to secure block 15A thereon by bolts 171 through apertures 171a and 171b. Moveable clamping member 174 is provided within body 174 which has a curved frontal surface 175 which matches curved surface 173 directly opposite on cross bar 12. Clamping member 174 is moved inward or outward by bolt 172 which threadedly engages body 180 and is rotatably secured to member 174 as by screw 176.

In use. the stinger (not shown) is placed through slots 151a and 152b and the packer joint (also not shown). The stinger is then secured to cross bar 12 by clamping block 15A and is then inserted into the vessel or pipeline until cross bar 12 abuts body 8. To insert the stinger further, the locking collet in the packer joint is tightened to retain the stinger in place while the clamping block 15A is loosened. Cross bar 12 may then be raised the full length and the clamping block 15A re-tightened about the stinger and locking collet loosened for further insertion. Slots 151a and 151b allow driving mechanism 7B to be removed from about stinger when the desired depth is reached and the locking collet re-secured about stinger. Removal of the stinger is a simple reversal of the process.

Figure 12:
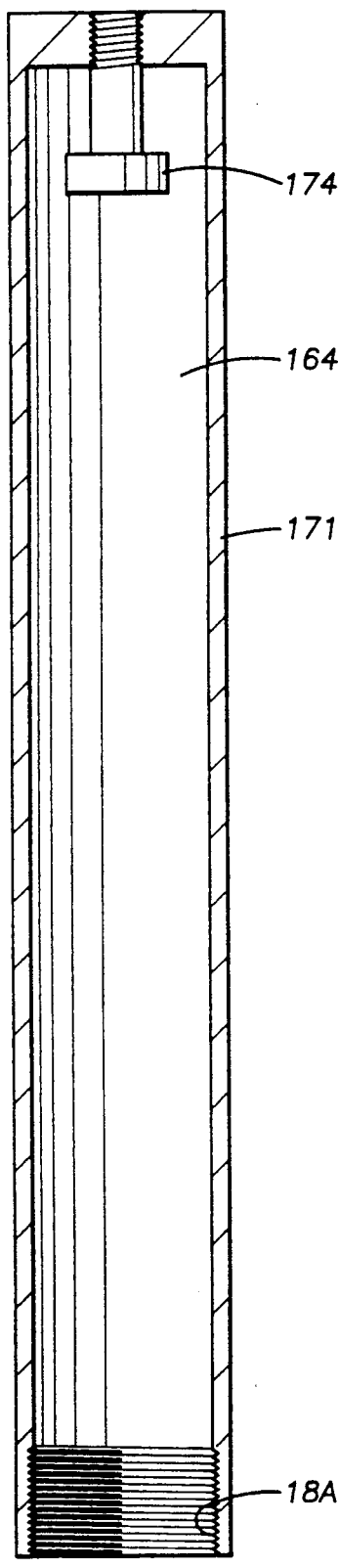
FIG. 12 is a side elevational view in partial cross section of one embodiment of the safety cap of the present invention.

If the stinger 13 is to be left in place, as with corrosion coupons. it is desirable to mount a safety cap over the external end thereof. A simple safety cap is illustrated in FIG. 12 which is a cylindrical body 171 closed at one end and having internal threads 118A at the opposite end. Internal threads 118A are adapted to fit external threads 118 on the upper end of packer joint 4. If desired, a push out rod 174 may be mounted in the closed end which will be pushed out and exposed if the stinger has been expelled outward. The push rod 174 may be painted a bright color to catch the attention of the operator alerting him that the stinger has been expelled.

Figure 13:
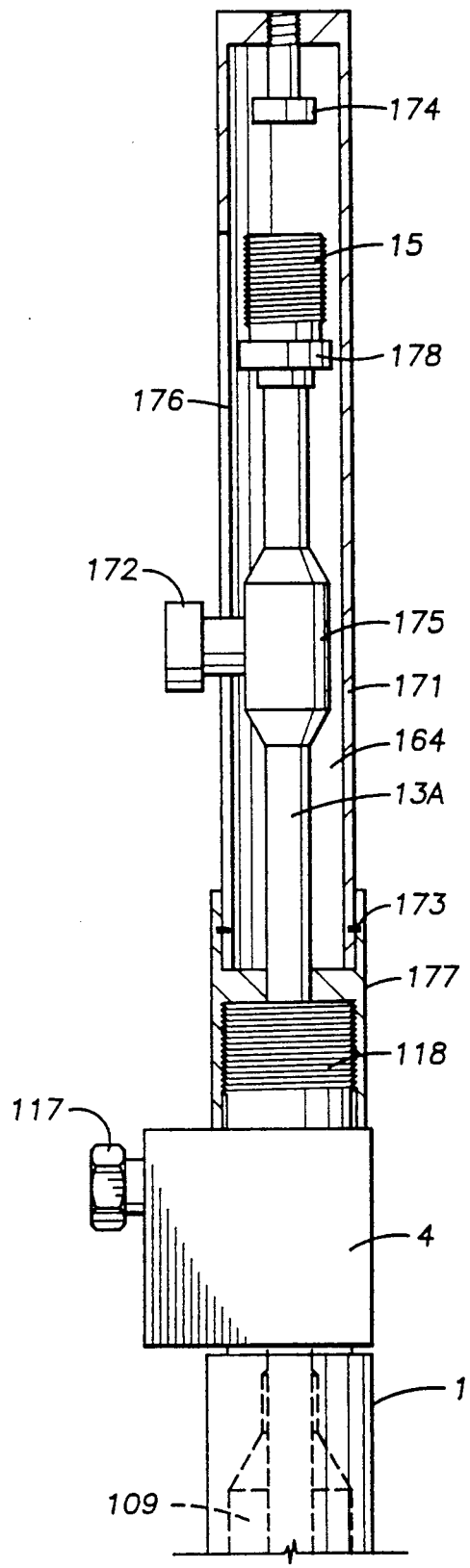
FIG. 13 is a side elevational view in partial cross section showing another embodiment of the safety cap.

A variation of the safety cap is shown mounted on the packer joint 4 in FIG. 13. The version there illustrated is for use when the stinger is a sampling or injection tube or having a port 172 for a valve which would extend beyond the wall of the cap. A milled slot 176 is provided in the wall of the cap to allow the cap to be slipped down over the valve port 172. Because the cap cannot be rotated with the stinger clamped in place a special mounting base is provided. The mounting base comprises a hex sleeve 177 which is rotatably connected to cylindrical body 171 by ring 173 within grooves in the sleeve 177 and body 171. The sleeve 177 can thus be rotated and threadedly engaged with the external threads 118 on packer joint 4. The push out rod 174 may be provided as in the simple safety cap.

Figure 14:
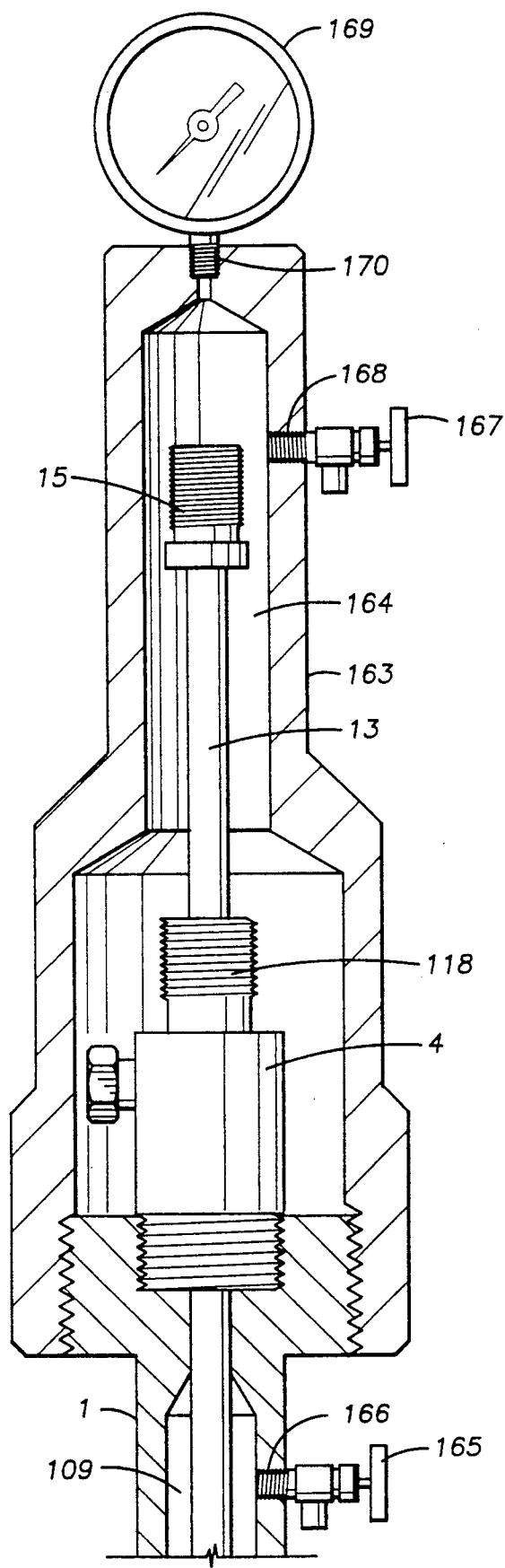
FIG. 14 is a side elevational view in partial cross section showing yet another embodiment of the safety cap.

Another version of the safety cap is shown in FIG. 14. The version illustrated there threadedly mounts on external threads 162 at the upper end of guide body 1. The cap completely encloses packer joint 4 and external end of stinger 13. Any gas leaking through packer joint 4 is contained within chamber 164 and may be bled out through bleeder valve 167 prior to removing cap. Lower bleeder valve 165 may be mounted on all versions of the guide body to bleed out pressure after the stinger 13 has been retrieved through the entry valve (not shown) and the valve closed. If the vessel or pipeline contains a hazardous material, the pressure gage 169 which is threaded connected to upper end of the safety cap will alert the operator that the packer has leaked. The pressure gage is in communication with chamber 164 and thus indicates the pressure therein.

The foregoing description of the invention has been directed to particular preferred embodiments of the present invention for purposes of explanation and illustration. It will be apparent to those skilled in the art that many modifications and changes in the apparatus may be made without departing from the scope and spirit of the invention. It is, therefore, intended that the following claims cover all equivalent modifications and variations as fall within the scope of the invention as defined by the claims.

What is claimed is:

1. An apparatus for inserting and removing a stinger in the interior of a pipeline or vessel, said stinger having an external end and an internal end comprising:
   (a) a packer assembly for sealable connection to an opening on said pipeline and adapted for sealing engagement to said stinger;
   (b) a driving mechanism adapted to be mounted on said packer assembly and adapted to releasably receive said external end to drive said stinger through said packer assembly and into said pipeline;
   (c) a base for said driving mechanism having a bore therethrough and connection means for mounting said base on said packer assembly with said external end passing through said bore;
   (d) a cross bar adapted to receive said external end and mounted in conjunction with said driving mechanism to drive said stinger in or out through said packer assembly; and
   (e) a clamping collet mounted within said packer assembly to releasably hold said stinger in the desired position after insertion.

2. The apparatus of claim 1 further comprising a removable safety cap adapted to be mounted on said packer assembly to provide a sealed chamber above said packer assembly and around said external end and prevent said stinger from being expelled from said pipeline after insertion.

3. The apparatus of claim 2 further comprising a pressure sensing and indicating apparatus mounted on said safety cap to sense and indicate the pressure in said chamber.

4. The apparatus of claim 1 further comprising:
   (a) a frame secured to base; and
   (b) power transmission means mounted within said base and supported by said frame.

5. The apparatus of claim 4 wherein said power transmission means comprises:
   (a) a pair of threaded rods rotatably mounted perpendicular to and within said base and supported by said frame, each of said threaded rods being in threaded engagement with said cross bar;
   (b) a pair of gear wheels, one each of said gear wheels secured to the lower end of one each of said pair of threaded rods within said base;

(c) a worm gear passed through said base perpendicular to said gear wheels and in rotatable engagement therewith; and (d) rotation means for rotating said worm gear.

6. The apparatus of claim 1 wherein said packer assembly comprises:

(a) a guide body for mounting on a pipeline or vessel entry valve, said guide body having an internal chamber and an aperture adapted to fit about said stinger;

(b) a packer joint mounted on said guide body;

(c) a packing seal mounted about said stinger in the open end of said aperture, said packing seal being forced into sealing engagement with said stinger when said packer joint is mounted on said guide body;

(d) a collet clamp mounted in said packer joint adapted to fit about said stinger; and (e) collet clamp actuating means to force said collet clamp tightly about said stinger and securely hold said stinger in the desired position.

7. The apparatus of claim 6 wherein said collet clamp and actuating assembly comprise:

(a) a cylindrical collet body having a bore through and normal to the walls thereof to fit about said stinger, said bore being open on one side by a slot, said body being mounted in said packer joint; and (b) an actuating bolt mounted in said packer joint normal to one end of said cylindrical body such that when said bolt is threaded inward said bolt forces the wall on either side of said slot together to tightly clamp about said stinger.

8. The apparatus of claim 6 wherein said collet clamp and actuating assembly comprise:

(a) an elongated cylindrical collet body adapted to fit in said packer joint such that said cylindrical body fits about said stinger within said packer joint, said collet body having a plurality of longitudinal slots along the walls thereof and tapered gripping jaws about the upper end; and (b) a collet clamp nut adapted to fit about said stinger and threaded into the upper end of said packer joint such that the lower end of said nut engages said clamping jaws and forces then into tight engagement with said stinger within said packer joint.

9. An apparatus for inserting and removing a stinger in the interior of a pipeline or vessel said stinger having an external end and internal end, comprising:

(a) a packer assembly for sealable connection to an opening on said pipeline and adapted for sealable engagement with said stinger;

(b) a clamping collet mounted within said packer assembly to releasably hold said stinger in the desired position after insertion;

(c) a base having a bore therethrough and connection means for mounting said base on said packer assembly with said external end passing through said bore;

(d) a frame secured to said base;

(e) power transmission means mounted within said base and supported by said frame; and (f) a cross bar adapted to releasably receive external end and mounted in conjunction with said power means to drive said stinger in or out through said packer assembly.

10. The apparatus of claim 9 wherein said power transmission means comprises:

(a) a pair of threaded rods rotatably mounted perpendicular to and within said base and supported by said frame, each of said threaded rods being in threaded engagement with said cross bar;

(b) a pair of gear wheels, one each of said gear wheels secured to the lower end of one each of said pair of threaded rods within said base;

(c) a worm gear passed through base perpendicular to said gear wheels and in rotatable engagement therewith; and (d) rotation means for rotating said worm gear.

11. An apparatus for inserting and removing a stinger in the interior of a pipeline or vessel said stinger an external end and an internal end, comprising:

(a) a packer assembly for sealable connection to an opening on said pipeline and adapted for sealable engagement about said stinger;

(b) a clamping collet mounted within said packer assembly to releasably hold said stinger in the desired position after insertion;

(c) a base having a bore therethrough and connection means for mounting said base on said packer assembly with said external end passing through said bore;

(d) a frame secured to said base;

(e) a pair of threaded rods rotatably mounted perpendicular to and within said base and supported by said frame;

(f) a pair of said gear wheels, one each of said gear wheels secured to the lower end of one each of said pair of threaded rods within said base;

(g) a worm gear passed through said base perpendicular to said gear wheels and in rotatable engagement therewith;

(h) rotation means for rotating said worm gear; and (i) a cross bar adapted to releasably receive said external end, said cross bar being in threaded engagement with each of said threaded rods such that when said threaded rods are rotated said cross bar drives said rod inward or outward through said packer assembly.

12. Insertion apparatus for inserting a stinger through a packer assembly on a pipeline said stinger having an external end and internal end, comprising:

(a) a base having a bore therethrough and connection means for mounting said base on said packer assembly with the external end of said stinger passing through said bore;

(b) a frame secured to said base;

(c) power transmission means mounted within said base and supported by said frame;

(d) a cross bar adapted to releasably receive said external end and mounted in conjunction with said power means to drive said stinger in or out through said packer assembly; and (e) a clamping collet mounted within said packer assembly to releasably hold said stinger in the desired position after insertion.

13. The apparatus of claim 12 wherein said power transmission mean comprises:

(a) a pair of threaded rods rotatably mounted perpendicular to and within said base and supported by said frame, each of said threaded rods being in threaded engagement with said cross bar;

(b) a pair of gear wheels, one each of said gear wheels secured to the lower end of one each of said pair of threaded rods within said base;

(c) a worm gear passed through said base perpendicular to said gear wheels and in rotatable engagement therewith; and (d) rotation means for rotating said worm gear.

14. Insertion apparatus for inserting a stinger through a packer assembly on a pipeline said stinger having an external end and internal end, comprising:

(a) a base having a bore therethrough and connection means for mounting said base on said packer assembly with said external end passing through said bore;

(b) a frame secured to said base;

(c) a pair of threaded rods rotatably mounted perpendicular to and within said base and supported by said frame;

(d) a pair of gear wheels, one each of said gear wheels secured to the lower end of one each of said pair of threaded rods within said base;

(e) a worm gear passed through said base perpendicular to said gear wheels and in rotatable engagement therewith;

(f) rotation means for rotating said worm gear;

(j) a cross bar adapted to releasably receive said external end, said cross bar being in threaded engagement with each of said threaded rods such that when said threaded rods are rotated said cross bar drives said rod inward or outward through said packer assembly; and (k) a clamping collet mounted within said packer assembly to releasably hold said stinger in the desired position after insertion.

15. A packer assembly for inserting a stinger into a pipeline or vessel, comprising:

(a) a guide body adapted to be mounted on a pipeline or vessel entry valve, comprising
   (1) an elongated housing,
   (2) attachment means for securing said housing to said entry valve,
   (3) an elongated chamber within said housing in alignment with the passage through said entry valve,
   (4) a conical dome at the upper end of said chamber,
   (5) an aperture through the upper end of said housing adapted to fit snugly about said stinger;

(b) a packer joint mounted on the upper end of said guide body, comprising
   (1) a packer joint body having bore therethrough in axial alignment with said aperture and said chamber, said bore adapted to fit around said stinger,
   (2) a collet clamp mounted within said packer joint body and adapted to fit snugly about said stinger,
   (3) a collet clamp actuation means for securely but releasably tightening said collet clamp about said stinger; and (c) a packing seal mounted in the upper end of said guide body and adapted to fit snugly about said stinger, said packing seal being forced into tight sealing engagement with said stinger when said packer joint is mounted on said guide body.

16. The packer assembly of claim 15 wherein said collet clamp comprises:

(a) an elongated body having a central bore therethrough adapted to fit snugly about said stinger;

(b) a base at the lower end of said elongated body adapted to secure said collet clamp in said packer joint body;

(c) a plurality of longitudinal slots in the walls of said body extending from the upper end thereof to near said base; and (d) gripping jaw as defined at the upper end of said elongated body between said slots, said gripping jaws having external surfaces which slope downward and outward from the upper ends thereof.

17. The packer assembly of claim 16 wherein said collet clamp actuation means comprises a nut adapted to fit around said stinger and internally threadable into the upper end of said packer joint body such that the lower end of said nut engages the sloping external surface of said gripping jaws and force said gripping jaws into tight engagement with said stinger.

18. Insertion apparatus for inserting a stinger through a packer assembly on a pipeline or vessel, comprising:

(a) a base having a first bore therethrough to allow passage of said stinger and connection means for mounting said base on said packer assembly, said bore having a first parallel communication slot to one face of said base;

(b) a frame secured to said base, said frame having two side members comprising guide rods, and a top member having a second bore therethrough to allow passage of said stinger, said bore having a second parallel communication slot to one face of said top member, said bores and said communication slots being in vertical alignment;

(c) a threaded rod rotatably mounted between said base and said top member;

(d) a first bevel gear mounted on the lower end of said threaded rod on said base;

(e) a second bevel gear mounted on said base in engagement with said first bevel gear and rotatable in response to a handle mounted on said base such that the rotation of said second bevel gear rotates said first bevel gear and said threaded rod;

(f) a cross bar in threaded engagement with said threaded rod and guided by said guide rods for upward and downward movement in said frame in response to the rotation of said threaded rod;

(g) a clamping block mounted on said cross bar to releasably secure said stinger to said cross bar movement therewith; and (h) a clamping collet mounted within said packer assembly to releasably hold said stinger in the desired position after insertion.

* * * * *